J. H. PAIGE.
COVER FOR FRUIT JARS.
APPLICATION FILED AUG. 19, 1915.
1,187,546.
Patented June 20, 1916.
2 SHEETS—SHEET 1.
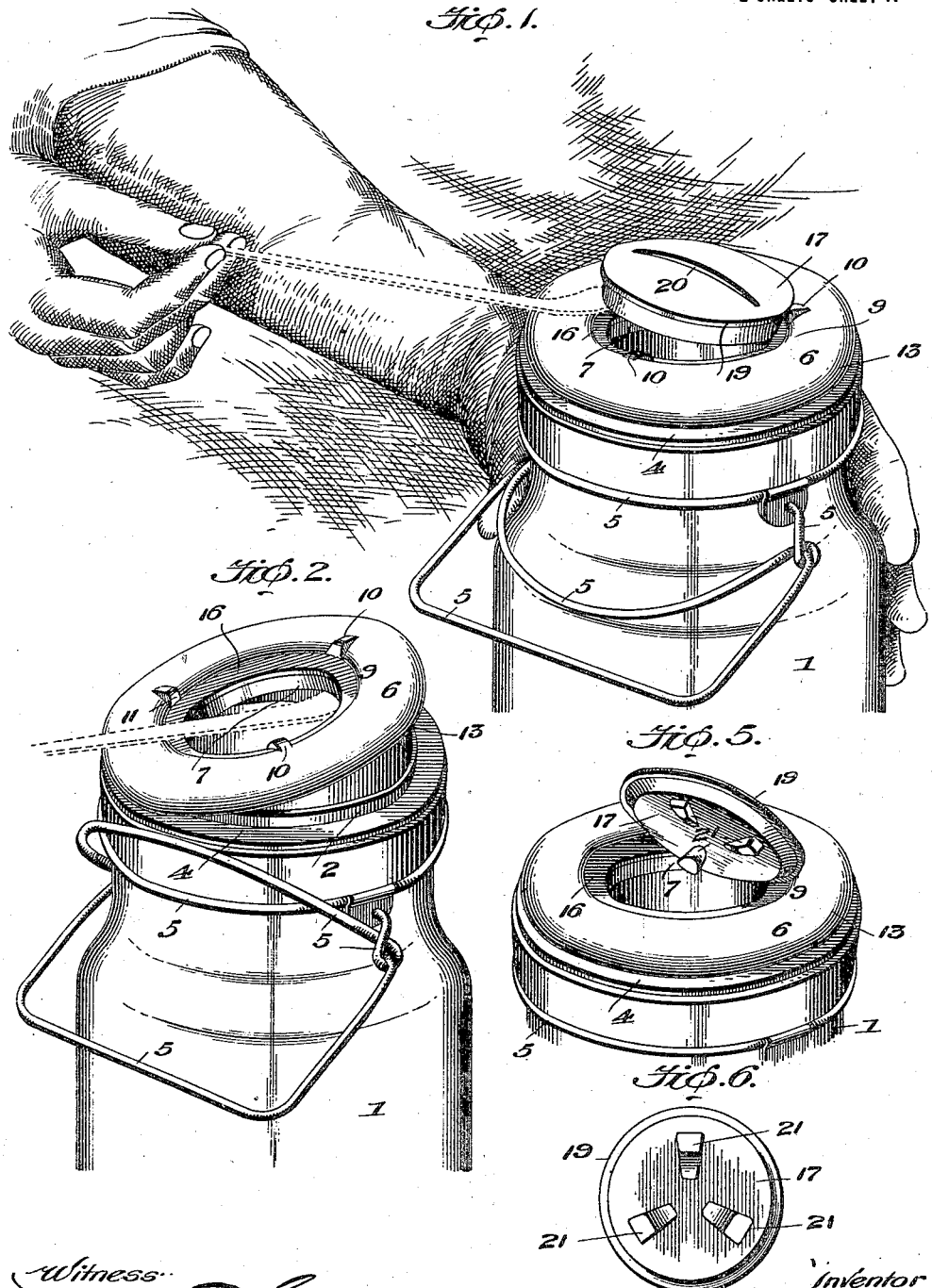

J. H. PAIGE.
COVER FOR FRUIT JARS.
APPLICATION FILED AUG. 19, 1915.
1,187,546.
Patented June 20, 1916.
2 SHEETS—SHEET 2.
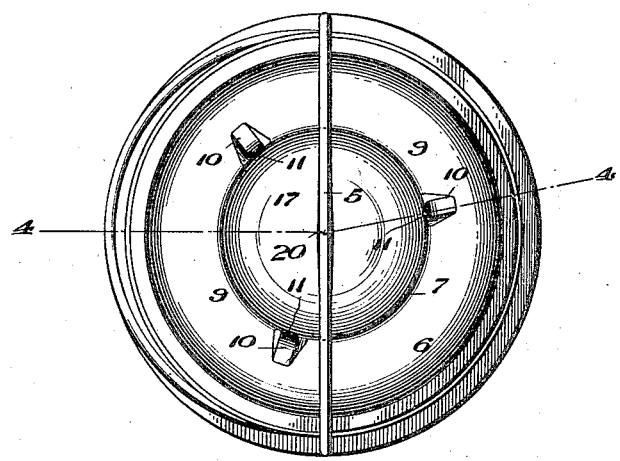
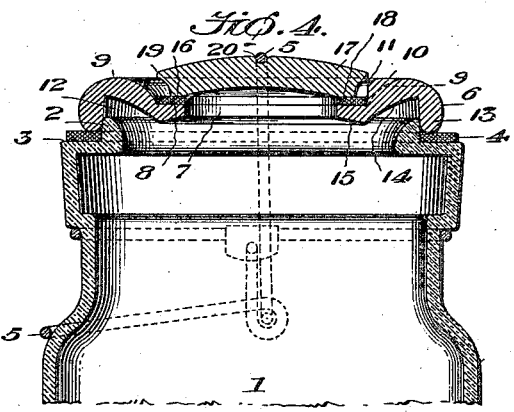
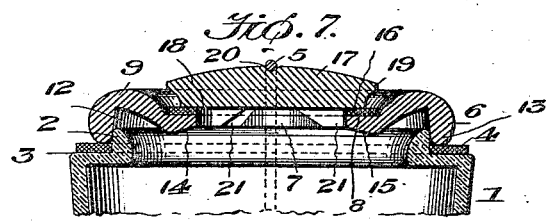
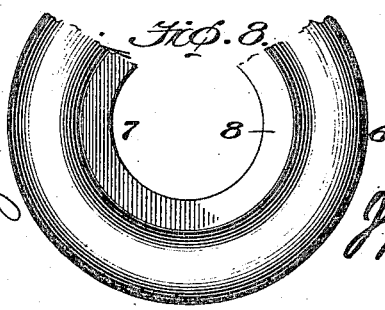

UNITED STATES PATENT OFFICE.

JAMES H. PAIGE, OF MANCHESTER, NEW HAMPSHIRE.

COVER FOR FRUIT-JARS.

1,187,546.

Specification of Letters Patent.

Patented June 20, 1916.

Application filed August 19, 1915. Serial No. 46,361.

*To all whom it may concern:*

Be it known that I, JAMES H. PAIGE, a citizen of the United States, residing at Manchester, county of Hillsboro and State of New Hampshire, have invented certain new and useful Improvements in Covers for Fruit-Jars, of which the following is a specification.

This invention relates to covers for fruit jars.

My invention has particular reference to covers for that class of fruit jars which employs a binding wire or bail or other clamping device for holding the cover down on the mouth of the jar. Covers for jars of this general class remain sealed after the binding bail or clamping device is released, for the reason that in the process of canning, the jar is for a long period subject to a temperature at about the boiling point which softens the rubber packing ring to such a degree that it becomes cemented to the jar and cover. Furthermore, the well-known adhesive properties of condensed fruit juice and sugar increase the adhesion of the parts, making it necessary to break this seal or adhesion in order that the cover may be removed, and the contents of the jar reached. Heating the jar is sometimes resorted to for this purpose, but is liable to cause cracking, breakage or spilling and subsequent cooling has to be resorted to. Another method is to employ some sharp instrument between the cover and jar, ofttimes resulting in splintering the glass of the jar or slippage of the instrument and injury to the user. Furthermore, the prying action and considerable force required invariably destroys the rubber gasket and hence its usefulness. One of the greatest dangers is that the splintered glass may reach the contents of the jar and render the same dangerous or unfit for use.

Generally stated, the object of my invention is to provide an improved cover for fruit jars of the class where a binding wire or clamping device is used, wherein the foregoing defects will be obviated and opening the jar made a simple and easy operation so that a child can readily accomplish it.

While the breaking of the vacuum is of assistance in releasing the fruit jar cover, and it has been proposed heretofore to provide vent holes for that purpose, breaking the vacuum will not render removal of the cover easy and in the ordinary type of cover it still remains necessary to pry off the cover and break the seal formed by the heated rubber becoming cemented to the jar and cover.

My invention, therefore, is not dependent on the breaking of the vacuum, but provides a novel construction of parts by which, once the clamping wire is released, the cover can be easily removed.

My invention embodies a ring of improved construction and form adapted to seat on the usual rubber ring or gasket and a separate, central, removable cover of improved form and arrangement related to the ring in a novel manner, whereby on the release of the cover, it may be readily removed, thus exposing a spacious opening in the ring into which the finger or some suitable device may be introduced and, with very slight pressure, the ring may be removed without danger of chipping or splintering the ring, due to the novel construction thereof.

In the following description I have set forth two forms which the invention may assume, but these are to be considered as illustrative, rather than restrictive, of the scope thereof as other modifications may be resorted to within the spirit of the invention.

In the accompanying drawings: Figure 1 is a perspective showing how the cover may be raised; Fig. 2, a similar view illustrating how the ring may be raised; Fig. 3, a plan view, the ring and cover being sealed; Fig. 4, a section on line 4—4, Fig. 3; Fig. 5, a view showing a modified cover which is in raised position; Fig. 6, a detail bottom view of the cover of Fig. 5; Fig. 7, a detail vertical section through the modification of Fig. 5; and Fig. 8, a view of the ring.

I have illustrated an ordinary fruit jar 1 having a flange 2 and seat 3.

4 represents the usual rubber gasket. An ordinary type of locking bail is shown at 5.

My invention comprises, in part, a ring 6 which has a relatively large or spacious opening 7 of a size for the convenient accommodation of the finger, a spoon, fork or other device. Surrounding the opening 7 is a flat seat 8 from which the ring rises in a laterally rounded form at 9. On the rounded portion 9 adjacent the seat 8 are lugs 10 which are preferably provided with vertical inner faces 11 and are rounded on their opposite sides.

The under side of the ring 6 is provided with an annular channel 12 which defines a flange 13 adapted to encircle the flange 2. The channel 12 has a sloping wall 14 and, surrounding the opening 7 on the inner face of the ring is an annular chamfer 15. The chamfer 15 prevents any splintering, nicking or breaking off of the ring (which is preferably of glass or porcelain) when an implement is inserted in the opening 7 to exert a leverage on the ring to remove it, as shown by dotted lines in Fig. 2. If, however, the finger is used in place of an implement, the chamfer 15 affords a smooth surface which prevents any injury to the finger used. The channel 12 is sufficiently deep to clear the upper edge of the flange 2 and consequently, the ring 6 may be pressed tightly against the gasket or rubber ring 4.

A removable packing ring or gasket 16 rests on the seat 8 and is held against lateral displacement by the lugs 10. A cover 17 of circular form, provided with a seat 18 adapted to bear on the gasket 16, is of a size adapting it to fit in between the lugs 10 and to be by them retained against lateral displacement. The cover has an annular flange 19 which is disposed so that it is entirely clear of the lugs 10 and the ring 6 and consequently, the cover is surrounded by an open space permitting the introduction of the finger or any instrument for the purpose of engaging the flange 19 so that the cover may be lifted with ease. The cover has a rounded top and is preferably provided with a diametrically arranged groove 20 to receive the locking portion of the bail 5.

In the modification shown in Figs. 5, 6 and 7, the lugs 21 are provided on the bottom of the cover and are so arranged that they enter the opening 7 and prevent lateral displacement of the cover. In this form it is not necessary to use lugs on the ring.

The jar being sealed, as shown in Figs. 4 or 7, when it is desired to have access to the contents thereof, the bail 5 is released and swung aside, whereupon the finger may be used, or a spoon, fork or other implement, to engage the flange 19. A slight leverage being then exerted, with the fulcrum on the rounded portion 9 of the ring, the cover can readily be raised from the gasket 16, as shown by dotted lines in Fig. 1; the finger or any suitable implement may be introduced into the opening 7 and engaged with the chamfer 15 for the purpose of easily and quickly lifting the ring from the gasket 4, as in Fig. 2.

Having thus described my invention, what I claim as new and desire to secure by Letters Patent, is:

1. A two-part removable cover for fruit jars comprising an outer removable ring having a relatively large central opening adapted to receive means for lifting said ring, said ring also having a seat and clearance space surrounding said opening, and a removable cover of smaller size than said clearance space and received therein and resting on said seat for the purpose of closing the opening aforesaid, said clearance space being adapted for the accommodation of means to lift the cover from the seat.

2. A two-part removable cover for fruit jars comprising an outer removable ring having a relatively large central opening adapted to receive means for lifting said ring, said ring also having a seat and clearance space surrounding said opening, and a removable cover of smaller size than said clearance space and received therein and resting on said seat for the purpose of closing the opening aforesaid, said cover being provided with an outstanding flange overhanging the clearance space and adapted to be engaged by means introduced in the clearance space for the purpose of lifting the cover from its seat.

3. A two-part removable cover for fruit jars comprising an outer removable ring having a relatively large central opening adapted to receive means for lifting said ring, a seat surrounding said opening and provided on its lower face with a chamfer surrounding said opening and arranged to be engaged by the lifting means inserted through the opening, and a removable cover adapted to rest on said seat.

4. A two-part removable cover for fruit jars comprising an outer removable ring having a relatively broad rounded top, a central depressed portion provided with a seat and surrounded by said rounded top, said ring having a relatively large central opening adapted to receive means for lifting said ring, said opening being surrounded by said seat, the ring being provided on its lower face with an annular channel disposed beneath the rounded top, a chamfer on the under face of the ring surrounding the central opening aforesaid, and a cover of smaller size than said central depressed portion adapted to rest on said seat and provided with an outstanding flange, said cover and flange being located wholly within said central depressed portion, said flanged cover and ring being separated by an annular clearance space for the accommodation of lifting means to engage the flange.

5. A two-part removable cover for fruit jars comprising an outer removable ring having a relatively broad upper face and a depressed central portion provided with a relatively large central opening adapted to receive means for lifting said ring and a seat surrounding said opening, and a removable circular cover disposed within said depressed central portion above said opening and resting on said seat, said cover being of smaller size than the depressed central portion and separated from said ring by a clearance space adapted for the accommodation of lifting means to engage the cover.

In testimony whereof, I hereunto affix my signature.

JAMES H. PAIGE.